(12) United States Patent
Narita et al.

(10) Patent No.: US 9,771,454 B2
(45) Date of Patent: Sep. 26, 2017

(54) METHOD OF PRODUCTION OF POLYETHER RUBBER

(71) Applicant: ZEON CORPORATION, Tokyo (JP)

(72) Inventors: Tomoyuki Narita, Tokyo (JP); Kazu Niwa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/106,469

(22) PCT Filed: Dec. 25, 2014

(86) PCT No.: PCT/JP2014/084287
§ 371 (c)(1),
(2) Date: Jun. 20, 2016

(87) PCT Pub. No.: WO2015/099027
PCT Pub. Date: Jul. 2, 2015

(65) Prior Publication Data
US 2017/0029564 A1 Feb. 2, 2017

(30) Foreign Application Priority Data
Dec. 26, 2013 (JP) .................... 2013-268988

(51) Int. Cl.
| | | |
|---|---|---|
| *C08G 59/14* | (2006.01) | |
| *C08G 65/333* | (2006.01) | |
| *C08G 65/24* | (2006.01) | |
| *C08F 283/00* | (2006.01) | |

(52) U.S. Cl.
CPC ....... *C08G 65/33317* (2013.01); *C08G 65/24* (2013.01); *C08G 2650/02* (2013.01)

(58) Field of Classification Search
CPC .................................................. C08G 65/33
USPC .................................................. 525/403, 540
See application file for complete search history.

(56) References Cited

U.S. PATENT DOCUMENTS

| | | | |
|---|---|---|---|
| 4,737,407 A | 4/1988 | Wycech | |
| 5,545,746 A | 8/1996 | Benzaria et al. | |
| 9,236,159 B2 * | 1/2016 | Yonemaru | C08G 65/333 |
| 2010/0200814 A1 | 8/2010 | Marui et al. | |
| 2012/0296049 A1 | 11/2012 | Yonemaru et al. | |
| 2013/0214209 A1 | 8/2013 | Hayano et al. | |
| 2014/0012012 A1 | 1/2014 | Hayano et al. | |
| 2014/0018507 A1 | 1/2014 | Hayano et al. | |
| 2015/0073098 A1 | 3/2015 | Shinohara | |

FOREIGN PATENT DOCUMENTS

| | | |
|---|---|---|
| EP | 1 972 658 A1 | 9/2008 |
| JP | 2000-129055 A | 5/2000 |
| JP | 3223978 B2 | 10/2001 |
| JP | 2004-035686 A | 2/2004 |
| JP | 35-15797 B2 | 4/2004 |
| JP | 36-03394 B2 | 12/2004 |
| JP | 43-02945 B2 | 7/2009 |
| JP | 45-07751 B2 | 7/2010 |
| JP | 46-27534 B2 | 2/2011 |
| JP | 2012-107230 A | 6/2012 |
| JP | 2012-214792 A | 11/2012 |
| JP | 56-51171 B2 | 1/2015 |
| WO | 2008/114706 A1 | 9/2008 |
| WO | 2011/081152 A1 | 7/2011 |
| WO | 2012/133769 A1 | 10/2012 |
| WO | 2012/133786 A1 | 10/2012 |
| WO | 2013/146648 A1 | 10/2013 |
| WO | 2014/050944 A1 | 4/2014 |

OTHER PUBLICATIONS

Mar. 3, 2015 Search Report issued in International Patent Application No. PCT/JP2014/084287.
Jun. 28, 2017 Extended European Search Report issued in European Patent Application No. 14873192.0.

* cited by examiner

*Primary Examiner* — Terressa Boykin
(74) *Attorney, Agent, or Firm* — Oliff PLC

(57) ABSTRACT

A method of production of a polyether rubber containing units expressed by the following general formula (1) in 0.1 mol % to less than 30 mol % including reacting a polyether rubber containing epihalohydrin monomer units in 0.1 mol % or more and a nitrogen atom-containing aromatic heterocyclic compound by kneading in the presence of an acid acceptor using an extruder-kneader so as to make at least part of halogen atoms forming the epihalohydrin monomer units be substituted by a group containing a cationic nitrogen-containing aromatic heterocyclic structure is provided.

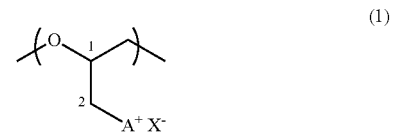

(1)

(wherein, in the above general formula (1), $A^+$ is a group containing a cationic nitrogen-containing aromatic heterocyclic structure, where the group containing a cationic nitrogen-containing aromatic heterocyclic structure is bonded with a carbon atom at the "2" position shown in the above general formula (1) through a nitrogen atom forming the cationic nitrogen-containing aromatic heterocyclic structure, and $X^-$ is any counter anion.)

10 Claims, No Drawings

METHOD OF PRODUCTION OF POLYETHER RUBBER

TECHNICAL FIELD

The present invention relates to a method of production of a polyether rubber, more particularly relates to a method of production of a polyether rubber having a group containing a cationic nitrogen-containing aromatic heterocyclic ring.

BACKGROUND ART

In an image-forming apparatus such as a printer, electronic photocopier, and facsimile apparatus, a conductive member such as a conductive roll, conductive blade, and conductive belt has been used for the mechanism where semiconductivity is required.

Such a conductive member, depending on their application, are being asked to provide a desired range of electroconductivity (electrical resistance value and variation in same, environmental dependency, and voltage dependency), various performances such as non-contaminating ability, low hardness, and dimensional stability.

As the rubber forming part of such a conductive member, a polyether rubber and the like which have semi-electrical conductivity in the rubber itself have been used. However, in recent years, in the image-fainting apparatus, higher speed has been demanded. For the conductive member, particularly the conductive roll, further lower electrical resistance has been desired.

Further, there has been conventionally a problem that, under application of voltage to a conductive member in which a polyether rubber and the like are used, upon continuous use, the conductive member deteriorated due to electric current so that electrical resistance value of the conductive member increases and quality of an image is impaired accordingly when used for the application of an image-forming device. For solving this problem, for example, Patent Document 1 discloses the art of introducing, into a polyether rubber, 0.1 mol % to less than 30 mol % of units of a monomer having onium ion introduced using a nitrogen atom-containing aromatic heterocyclic compound such as 1-methylimidazole as onium-forming agents.

However, when reacting a polyether rubber with the nitrogen atom-containing aromatic heterocyclic compound such as 1-methylimidazole react (onium-forming reaction) by the batch type method, there is the problem of poor productivity.

PRIOR ART DOCUMENTS

Patent Documents

Patent Document 1: Japanese Patent Publication No. 2012-107230A

SUMMARY OF THE INVENTION

Problem to be Solved by the Invention

An object of the present invention is to provide a method of production of a polyether rubber where a polyether rubber which is used for obtaining a cross-linked rubber with little variation in electrical resistance value, with low electrical resistance value, and with suppressed increase in electrical resistance value even if continuously used can be produced by a high production efficiency.

Means for Solving the Problems

The inventors engaged in intensive research to achieve the above object and as a result discovered that by making a polyether rubber containing epihalohydrin monomer units in 0.1 mol % or more and a nitrogen atom-containing aromatic heterocyclic compound react by kneading in the presence of an acid acceptor using an extruder-kneader, it is possible to produce a polyether rubber having the above characteristics by a high production efficiency and thereby completed the present invention.

That is, according to the present invention, there is provided a method of production of a polyether rubber containing units expressed by the following general formula (1) in 0.1 mol % to less than 30 mol % comprising reacting a polyether rubber containing epihalohydrin monomer units in 0.1 mol % or more and a nitrogen atom-containing aromatic heterocyclic compound by kneading in the presence of an acid acceptor using an extruder-kneader so as to make at least part of halogen atoms fainting the epihalohydrin monomer units be substituted by a group containing a cationic nitrogen-containing aromatic heterocyclic structure:

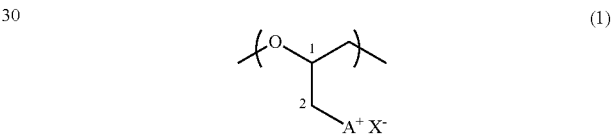

wherein, in the above general formula (1), $A^+$ is a group containing a cationic nitrogen-containing aromatic heterocyclic structure, where the group containing a cationic nitrogen-containing aromatic heterocyclic structure is bonded with a carbon atom at the "2" position shown in the above general formula (1) through a nitrogen atom fainting the cationic nitrogen-containing aromatic heterocyclic structure, and $X^-$ is any counter anion.

In the method of production of a polyether rubber of the present invention, preferably the extruder-kneader is a twin-screw extruder-kneader.

In the method of production of a polyether rubber of the present invention, preferably a kneading temperature by the extruder-kneader is 162° C. or more.

In the method of production of a polyether rubber of the present invention, preferably a kneading time by the extruder-kneader is 1 to 30 minutes.

In the method of production of a polyether rubber of the present invention, preferably the extruder-kneader with an L/D (screw length/screw diameter)=1 to 100 is used.

In the method of production of a polyether rubber of the present invention, preferably, as the acid acceptor, an oxide, hydroxide, and/or carbonate of at least one type of magnesium, calcium, and barium are used, more preferably an oxide and carbonate are used in combination, or a magnesium compound and calcium compound are used in combination, particularly preferably a magnesium oxide and calcium carbonate are used in combination.

In the method of production of a polyether rubber of the present invention, preferably a use amount of the acid acceptor is 0.1 to 30 parts by weight with respect to 100 parts by weight of the polyether rubber containing epihalohydrin monomer units in 0.1 mol % or more.

Effects of the Invention

According to the present invention, it is possible to produce with a high production efficiency a polyether rubber used for obtaining a cross-linked rubber with little variation in electrical resistance value, low electrical resistance value, and suppressed increase in the electrical resistance value even if continuously used.

DESCRIPTION OF EMBODIMENTS

<Method of Production of Polyether Rubber>

The method of production of a polyether rubber of the present invention is a method of production of a polyether rubber containing units expressed by a following general formula (1) in 0.1 mol % to less than 30 mol % comprising reacting a polyether rubber containing epihalohydrin monomer units in 0.1 mol % or more and a nitrogen atom-containing aromatic heterocyclic compound by kneading in the presence of an acid acceptor using an extruder-kneader so as to make at least part of halogen atoms fainting the epihalohydrin monomer units be substituted by a group containing a cationic nitrogen-containing aromatic heterocyclic structure:

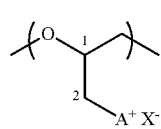

(1)

(wherein, in the above general formula (1), $A^+$ is a group containing a cationic nitrogen-containing aromatic heterocyclic structure, where the group containing a cationic nitrogen-containing aromatic heterocyclic structure is bonded with a carbon atom at the "2" position shown in the above general formula (1) through a nitrogen atom forming the cationic nitrogen-containing aromatic heterocyclic structure, and $X^-$ is any counter anion.)

Note that, below, "a group containing a cationic nitrogen-containing aromatic heterocyclic ring" will sometimes be referred to as an "onium ion-containing group". An "onium ion-containing group" means a group containing an onium ion structure or a group fainting an onium ion structure.

The polyether rubber containing epihalohydrin monomer units in 0.1 mol % or more used in the present invention can be obtained by ring-opening polymerization of an epihalohydrin monomer by the solution polymerization method or solvent slurry polymerization method etc. Note that, as explained later, the polyether rubber containing epihalohydrin monomer units in 0.1 mol % or more used in the present invention is preferably a copolymer obtained by ring-opening polymerization of an ethylene oxide monomer and unsaturated oxide monomer in addition to an epihalohydrin monomer. However, the epihalohydrin monomer has to be supplied to a copolymerization in 0.1 mol % or more.

The epihalohydrin monomer fainting the epihalohydrin monomer units is not particularly limited, but, for example, epichlorohydrin, epibromohydrin, epiiodohydrin, epifluorohydrin, etc. may be mentioned. Among these as well, epichlorohydrin is preferable. The epihalohydrin monomers may be used as single type alone or may be used as two types or more together.

The polymerization catalyst used when polymerizing an epihalohydrin monomer by ring-opening polymerization is not particularly limited so long as a general catalyst for polyether polymerization. As the polymerization catalyst, for example, a catalyst obtained by reacting organic aluminum with water and acetyl acetone (Japanese Patent Publication No. 35-15797); a catalyst obtained by reacting triisobutyl aluminum with phosphoric acid and triethylamine (Japanese Patent Publication No. 46-27534); a catalyst obtained by reacting triisobutyl aluminum with an organic acid salt of diazabicycloundecene and phosphoric acid (Japanese Patent Publication No. 56-51171); a catalyst consisting of a partial hydrolyzate of aluminum alkoxide and an organo zinc compound (Japanese Patent Publication No. 43-2945); a catalyst consisting of an organo zinc compound and polyvalent alcohol (Japanese Patent Publication No. 45-7751); a catalyst consisting of dialkyl zinc and water (Japanese Patent Publication No. 36-3394); and a catalyst consisting of tributyl tin chloride and tributyl phosphate (Japanese Patent No. 3223978) etc. may be mentioned.

As the solvent for polymerization is not specifically limited if it is inert, for example, aromatic hydrocarbons such as benzene and toluene; saturated linear hydrocarbons such as n-pentane and n-hexane; and, saturated cyclic hydrocarbons such as cyclopentane and cyclohexane; etc. may be used. Of these, when ring-opening polymerization is carried out based on solution polymerization, aromatic hydrocarbons are preferably used from the view point of solubility of the base polyether rubber. Toluene is more preferable.

The polymerization reaction temperature is preferably 20 to 150° C., while 40 to 130° C. is more preferable. The polymerization can be carried out according to any mode including a batch type, a semi-batch type, and a continuous type.

The polyether rubber containing epihalohydrin monomer units in 0.1 mol % or more may be any copolymer type of either a block copolymer or random copolymer, but a random copolymer is preferable.

The method of recovering the polyether rubber containing epihalohydrin monomer units in 0.1 mol % or more from a solvent is not particularly limited. For example, it is carried out by appropriately combining coagulation, filtration, and drying. As a method of coagulating the polyether rubber from a solvent in which the polyether rubber is dissolved, for example, a common method such as steam stripping or precipitation using a poor solvent can be used. Further, As a method of filtering the polyether rubber from slurry containing the polyether rubber, the method of using in accordance with need, for example, a sieve such as a rotary type screen and a vibrating screen; a centrifugal dehydrator; etc. may be mentioned. As the method of drying the polyether rubber, a dehydration method using a compression type dehydrator such as roll, Banbury type dehydrator, and screw extruder type dehydrator; a method of using a dryer such as screw type extruder, kneader type dryer, expander type dryer, heat wave type dryer, and reduced pressure type dryer; etc. may be mentioned. The compression type dehydrator and dryer may be each used either singly or in combination of two or more.

Further, in the method of production of the present invention, the polyether rubber containing epihalohydrin monomer units in 0.1 mol % or more and a nitrogen atom-containing aromatic heterocyclic compound are kneaded and reacted in the presence of an acid acceptor using an extruder-kneader to thereby substitute at least part of the halogen atoms fainting the epihalohydrin monomer units with a group containing a cationic nitrogen-containing aromatic heterocyclic ring and thus introduce into the polyether rubber the structural units expressed by the general formula (1).

In the present invention, when making the polyether rubber containing epihalohydrin monomer units in 0.1 mol % or more and the nitrogen atom-containing aromatic heterocyclic compound react, they are made to react by using an extruder-kneader to knead them. Due to this, reaction of these can be performed in a relatively short reaction time and by a continuous process, so production by a high production efficiency becomes possible. In addition, in the present invention, by performing reaction of these in the presence of the acid acceptor, it is possible to effectively prevent corrosion of the extruder-kneader (particularly, corrosion of the screws of the extruder-kneader). Due to this, it is possible to effectively prevent a drop in the production efficiency due to corrosion of the extruder-kneader. Note that, for example, instead of using an extruder-kneader, for example, the method of kneading the polyether rubber containing epihalohydrin monomer units in 0.1 mol % or more and the nitrogen atom-containing aromatic heterocyclic compound by open rolls, then hot pressing the obtained kneaded material to make them react may also be considered. With such a method, production is by a batch process, a long time is required for the reaction, etc., so the production efficiency is not necessarily sufficient. As opposed to this, according to the present invention, by employing the method of using an extruder-kneader for kneading to cause an onium fainting reaction (reaction introducing onium ion-containing group), the production efficiency can be suitably raised.

The nitrogen atom-containing aromatic heterocyclic compound (below, sometimes referred to as the "onium-forming agent") used in the present invention is not particularly limited so long as an aromatic heterocyclic compound containing a nitrogen atom. For example, five-membered heterocyclic compound such as imidazole, 1-methylimidazole, pyrrole, 1-methylpyrrole, thiazole, oxazole, pyrazole and isoxazole; six-membered heterocyclic compound such as pyridine, pyrazine, pyrimidine, pyridazine, triazine and 2,6-lutidine; condensed heterocyclic compound such as quinoline, isoquinoline, quinoxaline, quinazoline, cinnoline, purine, indole, isoindole, benzoimidazole, benzoxazole and benzoisoxazole; etc. may be mentioned. Among these as well, five-membered heterocyclic compound and six-membered heterocyclic compound are preferable. From the viewpoint of the stability of the substance after the reaction, 1-methylimidazole is more preferable.

The use amount of the onium-forming agent is not particularly limited, but, in accordance with the onium-forming agent which is used, the structure of the polyether rubber, of the substitution ratio of the onium ion-containing group in the target polyether rubber, etc., it is preferably determined so that the ratio of content of the units expressed by the general formula (1) becomes 0.1 mol % to less than 30 mol % in range. Specifically, the use amount of the onium-forming agent is usually 0.01 to 100 moles with respect to 1 mole of halogen atoms fainting the epihalohydrin monomer units of the polyether rubber which is used, preferably 0.02 to 50 moles, more preferably 0.03 to 10 moles, furthermore preferably 0.05 to 2 moles in range. If the use amount of the onium-forming agent is too small, the substitution reaction becomes slow and the polyether rubber having onium ion-containing groups (below, sometimes referred to as the "cationized polyether rubber") with the desired composition is liable to be unable to be obtained. On the other hand, if the use amount of the onium-forming agent is too large, it is liable to become difficult to remove the unreacted onium-forming agent from the obtained cationized polyether rubber.

The acid acceptor used in the present invention is not particularly limited, but, for example, oxide, hydroxide, carbonate, carboxylate, silicate, borate, phosphite, metaborate, etc. of a Group II metal of the Periodic Table such as magnesium oxide, calcium oxide, magnesium hydroxide, calcium hydroxide, barium hydroxide, magnesium carbonate, barium carbonate, calcium carbonate, calcium borate, calcium phthalate, calcium phosphite, calcium silicate, magnesium silicate, magnesium borate, magnesium metaborate, calcium metaborate, and barium metaborate; oxide, hydroxide, carbonate, carboxylate, silicate, borate, phosphite, metaborate, etc. of a Group XII metal of the Periodic Table such as zinc stearate and zinc oxide; oxide, basic carbonate, basic carboxylate, basic phosphite, basic sulfite, etc. of a Group XIV metal of the Periodic Table such as stannous oxide, basic stannous carbonate, stannous stearate, basic stannous phosphite, basic stannous sulfite, silicon oxide, silicon stearate; hydrotalcites; aluminum hydroxide gel compounds; etc. may be mentioned. The acid acceptor can be used as single type alone or as two types or more combined.

Note that, the acid acceptor traps hydrogen halides such as hydrogen chloride produced as a byproduct at the time of the onium-forming reaction and thereby can prevent corrosion of the extruder-kneader when kneading and reacting the polyether rubber containing epihalohydrin monomer units in 0.1 mol % or more and the nitrogen atom-containing aromatic heterocyclic compound by an extruder-kneader. Among these acid acceptors, since with even a small amount of addition, the corrosion preventing effect is large, oxides, hydroxides, or carbonates of magnesium, calcium, or barium are preferable, oxides or carbonates of magnesium or calcium are more preferable, and magnesium oxide or calcium carbonate are particularly preferable. Further, as the acid acceptor, from the viewpoint of the effect of addition becoming larger, use of two types or more combined is preferable. Among these as well, combinations of oxide and carbonate or combinations of magnesium compound and calcium compound are more preferable, and a combination of magnesium oxide and calcium carbonate is particularly preferable.

The use amount of the acid acceptor is not particularly limited, but it is preferably 0.1 to 30 parts by weight with respect to 100 parts by weight of the polyether rubber which is used, more preferably 1 to 20 parts by weight, furthermore preferably 3 to 10 parts by weight. If the use amount of the acid acceptor is too small, the effect of addition, that is, the effect of preventing corrosion of the extruder-kneader, is liable to end up falling. On the other hand, if too large, the rubber is liable to become too hard.

When making the polyether rubber containing epihalohydrin monomer units in 0.1 mol % or more and the onium-forming agent react, as the extruder-kneader used for this kneading, these may be any of a single-screw extruder-kneader, twin-screw extruder-kneader, higher than twin-screw multi-screw extruder-kneader, or other one and is not particularly limited, but from the viewpoint of further raising the production efficiency, use of a twin-screw extruder-kneader is preferable. The twin-screw extruder-kneader may be a type with screw shaft directions of the same direction or different directions and is not particularly limited. Further, the extruder-kneader used in the present invention preferably is one with an L/D (screw length/screw diameter) of 1 to 100, more preferably one with an L/D of 20 to 80.

Further, the method of charging the polyether rubber containing epihalohydrin monomer units in 0.1 mol % or more, the onium-forming agent, and the acid acceptor into the extruder-kneader is not particularly limited, but these may be separately continuously charged as one mode or these may be premixed and the obtained mixture continuously charged as another mode.

The kneading temperature when kneading by an extruder-kneader is preferably 150° C. or more, more preferably 162° C. or more, furthermore preferably 170° C. or more. The upper limit of the kneading temperature is preferably 250° C. or less, more preferably 200° C. or less. Further, the kneading time (that is, the dwell time of the kneaded material in the extruder-kneader at the time of kneading) is preferably 1 to 30 minutes, more preferably 1 to 15 minutes. In the present invention, the reaction between the polyether rubber containing epihalohydrin monomer units in 0.1 mol % or more and the onium-forming agent is performed in the presence of the acid acceptor using an extruder-kneader. Further, even when as explained above performing the reaction at a relatively high temperature and in a short time, it is possible to obtain a desired composition of polyether rubber having onium ion-containing group without causing corrosion of the extruder-kneader, so the kneading temperature and the kneading time are preferably made the above ranges. If the kneading temperature is too low, the substitution reaction becomes slow and the desired composition of the cationized polyether rubber is liable to be unable to be obtained. On the other hand, if the kneading temperature is too high, the polyether rubber which is used is liable to break down or the onium-forming agent is liable to evaporate. Further, if the kneading time is too short, the reaction becomes incomplete and a desired composition of a cationized polyether rubber is liable to be unable to be obtained. On the other hand, if the kneading time becomes too long, the production efficiency is liable to end up falling and also the polyether rubber is liable to break down.

Note that, in the present invention, when using an extruder-kneader to perform the kneading, the kneading causes the kneaded material itself to generate heat, so it is desirable to consider such generation of heat and adjust the heating temperature of the extruder-kneader to thereby make the kneading temperature the desired temperature. The kneading temperature when using an extruder-kneader to perform the kneading can, for example, be found by measurement of the temperature of the just discharged cationized polyether rubber which is discharged from the extruder-kneader. Further, in the present invention, the kneading time when using an extruder-kneader to perform the kneading (the dwell time of the kneaded material in the extruder-kneader at the time of kneading) can, for example, be controlled by adjusting the speed of charging the polyether rubber containing the epihalohydrin monomer units in 0.1 mol % or more, onium-forming agent, and acid acceptor which are charged into the extruder-kneader, the screw rotational speed of the extruder-kneader, etc.

Furthermore, in the method of production of the present invention, when using a cyclic secondary amines such as pyrrole (in the present invention, a "cyclic secondary amines" meaning a nitrogen atom-containing aromatic heterocyclic compound wherein one hydrogen atom is bonded with a nitrogen atom in the ring, same below) as an onium-forming agent, if necessary, it is possible to substitute a desired group for the hydrogen atom bonded with the nitrogen atom in the ring bonded with the carbon atom at the "2" position shown in the general formula (1). Specifically, by reacting the polyether rubber and cyclic secondary amine, then mixing a base, separating the protons bonded with the nitrogen atom, and further, for example, mixing and adding halogenated alkyl, it is possible to introduce the desired substituent such as in the following general formula (2).

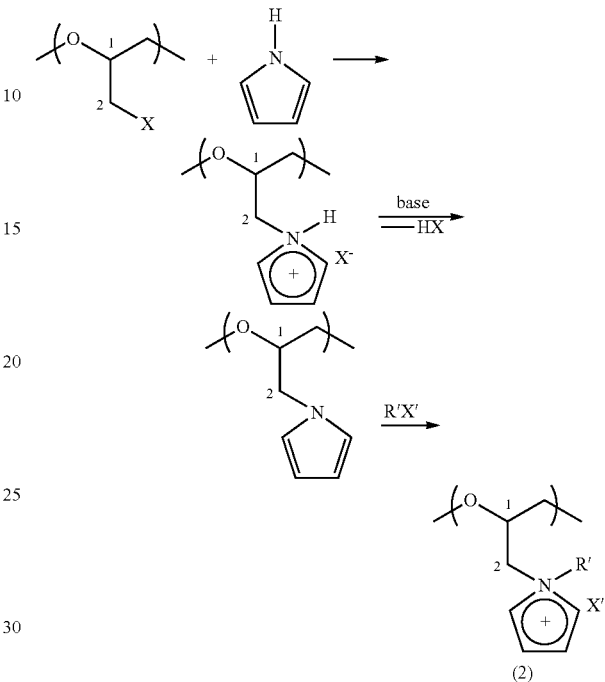

(where, in the general formula (2), R' indicates a $C_1$ to $C_{10}$ alkyl group, and X' indicates a halogen atom)

In the above way, according to the present invention, it is possible to obtain a polyether rubber containing 0.1 mol % to less than 30 mol % of units expressed by the general formula (1) (cationized polyether rubber). Since the polyether rubber obtained by the method of production of the present invention contains the units expressed by the general formula (1) in 0.1 mol % to less than 30 mol %, the cross-linked rubber obtained using the polyether rubber obtained by the method of production of the present invention has little variation in electrical resistance value, is low in electrical resistance value, and can suppress an increase in the electrical resistance value even in the case of continuous use.

In the units expressed by the above general formula (1), $A^+$ is a group which contains a cationic nitrogen-containing aromatic heterocyclic ring. The group which contains this cationic nitrogen-containing aromatic heterocyclic ring is bonded with the carbon atom at the "2" position which is shown in the above general formula (1) through a nitrogen atom which faints the cationic nitrogen-containing aromatic heterocyclic ring. The nitrogen-containing aromatic heterocyclic ring in the cationic nitrogen-containing aromatic heterocyclic ring in the group which contains the cationic nitrogen-containing aromatic heterocyclic ring is not limited so long as it has a nitrogen atom in the ring and has an aromatic nature. For example, other than the nitrogen atom which bonds with the carbon atom at the "2" position which is shown in the above general formula (1) in the heterocyclic ring, this may have another nitrogen atom, may have hetero atom other than a nitrogen atom such as oxygen atom and sulfur atom, further, may have at least part of the atoms which faint the heterocyclic ring substituted by substituents. Further, a polycyclic structure where two or more rings are condensed may also be used. As the structure of such a nitrogen-containing aromatic heterocyclic ring, for example, five-membered heterocyclic ring such as imidazole ring, pyrrole ring, thiazole ring, oxazole ring, pyrazole ring and isoxazole ring; six-membered heterocyclic ring such as pyridine ring, pyrazine ring, pyrimidine ring, pyridazine ring and triazine ring; condensed heterocyclic ring such as quinoline ring, isoquinoline ring, quinoxaline ring, quinazoline ring, cinnoline ring, purine ring, indole ring, isoindole ring, benzoimidazole ring, benzoxazole ring and benzoisoxazole ring; etc. may be mentioned. Among these as well, a five-membered heterocyclic ring and six-membered heterocyclic ring are preferable, while an imidazole ring is more preferable. In the polyether rubber of the present invention, in units expressed by the above general formula (1), $A^+$ is respectively independent. In the polyether rubber of the present invention, there may be two or more types of groups which contain cationic nitrogen-containing aromatic heterocyclic rings.

The substituent of the above nitrogen-containing aromatic heterocyclic ring is not particularly limited, but, for example, an alkyl group; cycloalkyl group; alkenyl group; aryl group; arylalkyl group; alkylaryl group; alkoxyl group; alkoxyalkyl group; aryloxy group; alkanol group; hydroxyl group; carbonyl group; alkoxycarbonyl group; amino group; imino group; nitrile group; alkylsilyl group; halogen atom; etc. may be mentioned.

In the present invention, in the above general formula (1), as the group which contains a cationic nitrogen-containing aromatic heterocyclic ring as shown by $A^+$, a group expressed by the following general formula (3) is preferable.

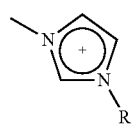

(3)

(In the above general formula (1), the N— which is shown in the above general formula (3) is bonded with the carbon atom at the "2" position which is shown in the above general formula (1). Further, the R which is shown in the above general formula (3) indicates a hydrogen atom or a $C_1$ to $C_{20}$ hydrocarbon group.)

The R which is shown in the above general formula (3) is preferably a $C_1$ to $C_{10}$ alkyl group, more preferably a methyl group.

In the polyether rubber obtained by the method of production of the present invention, the ratio of content of units expressed by the general formula (1) is 0.1 mol % to less than 30 mol % in the total monomer units, preferably 0.5 to 25 mol %, particularly preferably 0.7 to 12 mol %. If the ratio of content of the units expressed by the above general formula (1) is within the above range, a polyether rubber is obtained which can give a cross-linked rubber which has a small compression set, which has a low electrical resistance value, and which can suppress the increase in volume resistivity value caused by electric current. On the other hand, if the ratio of content of the units expressed by the above general formula (1) is too small, sometimes the obtained cross-linked rubber becomes high in volume resistivity value and the electrical resistance value increases when continuous applying voltage. Further, if the ratio of content of the units expressed by the above general formula (1) is too large, sometimes the polyether rubber becomes hard and the properties of the rubber elastomer are lost.

The "any counter anion" expressed by $X^-$ in the general formula (1) is a compound or atom which has a negative charge and which is bonded with $A^+$ by an ion bond and is not particularly limited other than that it have a negative charge. The counter anion forms an ionizing ion bond, and therefore a known ion exchange reaction can be used for anion exchange with the counter anions at least in part. At the stage of the onium-forming agent and polyether rubber containing epihalohydrin monomer units in 0.1 mol % or more being kneaded in the presence of the acid acceptor by an extruder-kneader and the reaction ending, the X of the above general formula (1) is a halogen atom, but a known anion exchange reaction may be performed with respect to the counter anion of $A^+$, that is, the halogen atom. The anion exchange reaction can be performed by mixing an ionic compound having ionizability with the polyether rubber having onium ion-containing groups. The conditions for performing the anion exchange reaction are not particularly limited, but should be determined according to the ionic compound which is used or the structure of polyether rubber which is used, or the targeted substitution rate of the counter anions of the $A^+$, etc. The reaction may be performed by only the ionic compound and the polyether rubber having onium ion-containing groups, but an organic solvent and other compounds may be included as well. The use amount of the ionic compound is not particularly limited, but is usually 0.01 to 100 moles, preferably 0.02 to 50 moles, more preferably 0.03 to 10 moles in range with respect to 1 mole of halogen atoms fainting the epihalohydrin monomer units. If the amount of ionic compound is too small, the substitution reaction is liable to become harder to proceed. On the other hand, if too great, removal of ionic compounds is liable to become difficult.

The pressure at the time of an anion exchange reaction is usually 0.1 to 50 MPa, preferably 0.1 to 10 MPa, more preferably 0.1 to 5 MPa. The temperature at the time of the reaction is usually −30 to 200° C., preferably −15 to 180° C., more preferably 0 to 150° C. The reaction time is usually 1 minute to 1000 hours, preferably 3 minutes to 100 hours, more preferably 5 minutes to 10 hours, furthermore preferably 5 minutes to 3 hours.

The anion species of the counter anions is not particularly limited, but for example, halide ions such as fluoride ions, chloride ions, bromide ions and iodide ions; sulfuric acid ions; sulfurous acid ions; hydroxide ions; carbonate ions; hydrogencarbonate ions; nitrate ions; acetate ions; perchlorate ions; phosphate ions; alkyloxy ions; trifluoromethane sulfonate ions; bistrifluoromethane sulfonimide ions; hexafluorophosphate ions; and tetrafluoroborate ions; etc. may be mentioned.

As the method of investigating the ratio of content of the units expressed by the general formula (1) in the polyether rubber obtained by the method of production of the present invention (below, sometimes referred to as the "content ratio of onium ion units"), a known method may be used. As the method of investigating the ratio of content of the units expressed by the general formula (1) in the polyether rubber obtained by the method of production of the present invention (below, sometimes referred to as the "content ratio of onium ion units"), a known method may be used. For simple and quantitative determination of the content ratio of onium ion unit, content of an onium ion-containing group can be quantified by $^1$H-NMR measurement of the polyether rubber obtained by the method of production of the present invention. Specifically, from the integrated values of the proton derived from the polyether chain that is a main chain of the cationized polyether rubber, mole number B1 of the entire monomer units in the polymer (including onium ion unit) is calculated. Subsequently, from the integrated values of the proton derived from an onium ion-containing group, mole number B2 of the onium ion unit introduced (the unit represented by the formula (1)) is calculated. Thereafter, by dividing the mole number B2 of the onium ion unit introduced (the unit represented by the formula (1)) by the mole number B1 of the entire monomer units in the polymer (including onium ion unit), content ratio of onium ion unit can be calculated based on the following formula.

Content ratio of onium ion unit (mol %)=100×$B2/B1$

Further, when the onium-forming agent used for the reaction is not consumed by any other reaction other than the substitution reaction of an onium ion-containing group under the reaction condition described above, molar amount of the consumed onium-forming agent will be the same as the molar amount of the halogen atoms substituted by the onium ion-containing group. Thus, by calculating the molar amount of consumed onium-forming agent by subtracting the residual molar amount of A2 after the reaction from the molar amount A1 added before the reaction and the resulting value is divided by molar amount P of the entire monomer units in the polyether rubber before reaction with the onium-forming agent (below, sometimes referred to as the "base polyether rubber"), content ratio of onium ion unit can be also calculated based on the following formula.

Content ratio of onium ion unit (mol %)=100×($A1$−$A2$)/$P$

Molar consumption amount can be measured by a known measurement method. The reaction ratio can be measured by gas chromatography (GC) equipped with a capillary column and a flame ionization detector (FID).

Further, the polyether rubber obtained by the method of production of the present invention is preferably a copolymer having units expressed by the general formula (1) as an essential component and contains units expressed by the general formula (1) and [epihalohydrin monomer units and/or unsaturated oxide monomer units], more preferably is a copolymer containing the units expressed by the general formula (1), ethylene oxide monomer units, and [epihalohydrin monomer units and/or unsaturated oxide monomer units] and is furthermore preferably a copolymer containing units expressed by the general formula (1), ethylene oxide monomer units, epihalohydrin monomer units, and unsaturated oxide monomer units.

The polyether rubber obtained by the method of production of the present invention preferably contains cross-linkable monomer units. As the cross-linkable monomer units, epihalohydrin monomer units and/or unsaturated oxide monomer units are preferable.

As the epihalohydrin monomer, the above-mentioned epihalohydrin monomers able to be used for the polyether rubber containing epihalohydrin monomer units in 0.1 mol % or more can be used. In the polyether rubber obtained by the method of production of the present invention, the ratio of content of the epihalohydrin monomer units is preferably 99.9 to 0 mol % in the total monomer units, more preferably 78.5 to 10 mol %, particularly preferably 57.3 to 15 mol %. If the ratio of content of the epihalohydrin monomer units is in this range, a polyether rubber able to give a cross-linked rubber able to suppress the increase in the volume resistivity value due to carried current is obtained. On the other hand, if the ratio of content of the epihalohydrin monomer units is too great, sometimes the obtained cross-linked rubber increases in volume resistivity value, while if too small, sometimes the obtained cross-linked rubber becomes insufficient in cross-linking and it becomes difficult to maintain the shape of the cross-linked rubber.

The unsaturated oxide monomer which forms the unsaturated oxide monomer unit is not particularly limited so long as containing in the molecule at least one carbon-carbon unsaturated bond (except carbon-carbon unsaturated bond of aromatic ring) and at least one epoxy group, but, for example, alkenyl glycidyl ethers such as allyl glycidyl ether and butenyl glycidyl ether; alkenyl epoxides such as 3,4-epoxy-1-butene, 1,2-epoxy-5-hexene, and 1,2-epoxy-9-decene; etc. may be mentioned. Among these as well, alkenyl glycidyl ethers are preferable, while an allyl glycidyl ether is more preferable. The unsaturated oxide monomer may be used alone as one type or in combination of two or more types. The ratio of content of the unsaturated oxide monomer unit in the polyether rubber obtained by the method of production of the present invention is preferably 15 to 0 mol % in the total monomer units, more preferably 12 to 1 mol %, particularly preferably 10 to 2 mol %. If the ratio of content of the unsaturated oxide monomer unit in the polyether rubber is in the range, a polyether rubber which is excellent in cross-linkability is obtained. On the other hand, if the ratio of content of the unsaturated oxide monomer unit is too small, the obtained cross-linked rubber sometimes deteriorates in compression set. Further, if the ratio of content of the unsaturated oxide monomer units is too large, during the polymerization reaction, a gelling reaction (3 dimensionality cross-linking reaction) etc. easily occur in the polymer molecules or among polymer molecules and the shapeability is liable to drop.

Further, when using the polyether rubber obtained by the method of production of the present invention as a material of a conductive member, particularly a conductive roll, the polyether rubber obtained by the method of production of the present invention preferably contains ethylene oxide monomer units from the viewpoint of low electrical resistance.

The ethylene oxide monomer units are units fainted by an ethylene oxide monomer. In the polyether rubber obtained by the method of production of the present invention, the ratio of content of the ethylene oxide monomer units is preferably 90 to 0 mol % in the total monomer units, more preferably 80 to 20 mol %, particularly preferably 75 to 40 mol %. If the ratio of content of the ethylene oxide monomer units in the polyether rubber is in that range, polyether rubber excellent in low electrical resistance is obtained. On the other hand, if the ratio of content of the ethylene oxide monomer units is too small, the effect of reduction of the electrical resistance value of the obtained cross-linked rubber becomes difficult to obtain. Further, if the ratio of content of the ethylene oxide monomer units is too large, production of the polyether rubber is liable to become difficult.

The polyether rubber obtained by the method of production of the present invention may also be a copolymer containing, in addition to the units expressed by the general formula (1), epihalohydrin monomer units, unsaturated oxide monomer units, and ethylene oxide monomer units, in accordance with need, other monomer units able to copolymerize with the units expressed by the general formula (1) and the monomer units. Among these other monomer units, alkylene oxide monomer units excluding ethylene oxide are preferable. The alkylene oxide monomer fainting the alkylene oxide monomer units excluding ethylene oxide is not particularly limited, but, for example, linear or branched alkylene oxide such as propylene oxide, 1,2-epoxybutane, 1,2-epoxy-4-chloropentane, 1,2-epoxyhexane, 1,2-epoxyoctane, 1,2-epoxydecane, 1,2-epoxyoctadecane, 1,2-epoxyeicosan, 1,2-epoxyisobutane, and 2,3-epoxyisobutane; cyclic alkylene oxide such as 1,2-epoxycycloropentane, 1,2-epoxycyclohexane, and 1,2-epoxycyclododecane; glycidyl ether having a linear or branched alkyl such as butyl glycidyl ether, 2-ethylhexyl glycidyl ether, 2-methyloctyl glycidyl ether, neopentyl glycol diglycidyl ether, decyl glycidyl ether, and stearyl glycidyl ether; glycidyl ether having an oxyethylene side chain such as ethylene glycol diglycidyl ether, diethylene glycol diglycidyl ether, and polyethylene glycol diglycidyl ether; etc. may be mentioned. Among these as well, linear alkylene oxide is preferable, while propylene oxide is more preferable. These alkylene oxide monomers may be used as single types alone or as two types or more together. In the polyether rubber obtained by the method of production of the present invention, the ratio of content of the alkylene oxide monomer units other than the ethylene oxide is preferably 30 mol % or less in the total monomer units, more preferably 20 mol % or less, furthermore preferably 10 mol % or less. If the ratio of content of the alkylene oxide monomers other than ethylene oxide in the polyether rubber is too large, the obtained cross-linked rubber is liable to increase in volume resistivity value.

Further, the other copolymerizable monomers other than an alkylene oxide monomer are not particularly limited, but for example, arylepoxides such as styrene oxide, and phenylglycidyl ether; etc. may be mentioned. In the polyether rubber obtained by the method of production of the present invention, the ratio of content of the other copolymerizable monomer other than an alkylene oxide monomer is preferably 20 mol % or less in the total monomer units, more preferably 10 mol % or less, furthermore preferably 5 mol % or less.

The polyether rubber obtained by the method of production of the present invention preferably has a weight average molecular weight of 200,000 to 2,000,000, more preferably 400,000 to 1,500,000. If the weight average molecular weight is too high, the Mooney viscosity becomes higher and the shaping is liable to become difficult. On the other hand, if the weight average molecular weight is too low, the obtained cross-linked rubber is liable to deteriorate in compression set.

The polyether rubber obtained by the method of production of the present invention preferably has a Mooney viscosity (polymer Mooney viscosity—$ML_{1+4}$, 100° C.) of 10 to 120, more preferably 20 to 90. If the Mooney viscosity is too high, the rubber becomes inferior in shapeability and shaping for conductive member applications becomes difficult. Further, swell (that is, diameter of an extruded article is larger than the diameter of a die during extrusion molding) occurs and the dimensional stability is liable to fall. On the other hand, if the Mooney viscosity is too low, the obtained cross-linked rubber is liable to fall in mechanical strength.

<Cross-Linkable Rubber Composition>

Further, in the present invention, the polyether rubber obtained by the method of production of the present invention may have a cross-linking agent mixed in with it to obtain a cross-linkable rubber composition.

The cross-linking agent which is used in the present invention may be suitably selected by the presence of the above-mentioned cross-linkable monomer unit and type of the same etc., but is not particularly limited so long as it is one which can cross-link the polyether rubber obtained by the method of production of the present invention. As such a cross-linking agent, for example, sulfur such as powdery sulfur, precipitated sulfur, colloidal sulfur, insoluble sulfur, and highly dispersed sulfur; sulfur-containing compounds such as sulfur monochloride, sulfur dichloride, morpholine disulfide, alkyl phenol disulfide, dibenzothiazyl disulfide, N, N'-dithio-bis(hexahydro-2H-azenopine-2), phosphorus-containing polysulfide, and polymer sulfides; organic peroxides such as dicumyl peroxide and di-t-butyl peroxide; quinone dioximes such as p-quinone dioxime, and p,p'-dibenzoylquinone dioxime; organic polyvalent amine compounds such as triethylene tetramine, hexamethylene diamine carbamate, and 4,4'-methylne bis-o-chloroaniline; triazine compounds such as s-triazine-2,4,6-trithiol; an alkyl phenol resins having a methylol group; etc. may be mentioned. Among these, sulfur, a sulfur-containing compound, or a triazine compound is preferable. When using a cross-linkable monomer comprised of an unsaturated oxide monomer, sulfur or a sulfur-containing compound is more preferable. These cross-linking agents are used alone or in combination of two or more types. The addition ratio of the cross-linking agent is not particularly limited, but is preferably 0.1 to 10 parts by weight with respect to 100 parts by weight of the polyether rubber obtained by the method of production of the present invention, more preferably 0.2 to 7 parts by weight, furthermore preferably 0.3 to 5 parts by weight. If the amount of the cross-linking agent is too small, the cross-linking rate is liable to become slow, productivity of the obtained cross-linked rubber may be lowered. Further, when the cross-linked rubber obtained thereby is used after grinding, the grindability may be impaired. On the other hand, if the amount of the cross-linking agent is too great, the obtained cross-linked rubber may become higher in hardness or the cross-linking agent may bloom.

When sulfur or a sulfur-containing compound is used as a cross-linking agent, it is preferable to use a cross-linking acceleration aid and a cross-linking accelerator in combination. As the cross-linking acceleration aid, although not specifically limited, for example, zinc oxide and stearic acid etc. may be mentioned. As the cross-linking accelerator, for example, although not specifically limited, guanidine-based; aldehyde/amine based; aldehyde/ammonia-based; thiazole-based; sulfenamide based; thiourea-based; thiuram-based; and dithiocarbmaic acid salt-based; etc. may be mentioned. The cross-linking acceleration aid and cross-linking accelerator may respectively be used as single types alone or as two or more types together.

The amounts of each use of the cross-linking acceleration aid and cross-linking accelerator are not particularly limited, but are preferably 0.01 to 15 parts by weight, more preferably 0.1 to 10 parts by weight, with respect to 100 parts by weight of the polyether rubber obtained by the method of production of the present invention. If the amounts of use of the cross-linking acceleration aid and cross-linking accelerator are too great, the cross-linking rate is liable to become too fast and a bloom is liable to faint on the surface of the obtained cross-linked rubber. On the other hand, if too small, the cross-linking rate becomes slow and the productivity inferior, the cross-linking does not sufficiently proceed, and the obtained cross-linked rubbers are liable to become inferior in mechanical properties.

The cross-linkable rubber composition may contain, in a range not impairing the effects of the present invention, diene-based rubber such as butadiene rubber, styrene butadiene rubber, chloroprene rubber, isoprene rubber, natural rubber, acrylonitrile butadiene rubber, butyl rubber, or partially hydrogenated product of those rubbers (for example, hydrogenated nitrile rubber); rubber other than the diene-based rubber such as ethylene propylene rubber, acrylic rubber, polyether rubber (excluding the polyether rubber of the present invention), fluoro rubber, or silicone rubber; thermoplastic elastomer such as olefin-based thermoplastic elastomer, styrene-based thermoplastic elastomer, vinyl chloride-based thermoplastic elastomer, polyester-based thermoplastic elastomer, polyamide-based thermoplastic elastomer, or polyurethane-based thermoplastic elastomer; and a resin such as polyvinyl chloride, a cumarone resin, or a phenol resin. The rubber, thermoplastic elastomer, and resin may be used either singly or in combination of two or more. Total amount of them is preferably 100 parts by weight or less, more preferably 50 parts by weight or less, and furthermore preferably 20 parts by weight or less with respect to 100 parts by weight of the polyether rubber obtained by the method of production of the present invention.

Further, the cross-linkable rubber composition may contain another additive usually mixed into known rubber in addition to the above-mentioned additives. Such an additive is not particularly limited, but for example, a filler; acid acceptor; reinforcing agent; antioxidant; UV absorbing agent; light stabilizer; tackifier; surfactant; conductivity imparting material; electrolyte material; colorant (dye and pigment); flame retardant; anti-static agent; etc. may be mentioned.

The cross-linkable rubber composition can be prepared by mixing and kneading a cross-linking agent and various additives which are used in accordance with need into the polyether rubber obtained by the method of production of the present invention by a desired method. For example, the additives other than the cross-linking agent and cross-linking accelerator may be kneaded with the polyether rubber, then the cross-linking agent and cross-linking accelerator may be mixed with the mixture to obtain the cross-linkable rubber composition. At the time of mixing and kneading, for example, a kneader, Bambury mixer, open roll, calendar roll, extruder, or any other kneading/molding machine may be used alone or in combination for kneading and shaping. The kneading temperature of the additives other than the cross-linking agent and cross-linking accelerator and the polyether rubber is preferably 20 to 200° C., more preferably 20 to 150° C., while the kneading time is preferably 30 seconds to 30 minutes. The mixing temperature of the kneaded mixture and the cross-linking agent and cross-linking accelerator is preferably 100° C. or less. 0 to 80° C. is more preferable.

<Cross-Linked Rubber>

Further, in the present invention, it is possible to cross-link the cross-linkable rubber composition obtained in the above way to obtain cross-linked rubber.

The method for cross-linking the cross-linkable rubber composition of the present invention is not specifically limited. The cross-linking may be carried out either simultaneously with molding or after molding. The temperature for molding is preferably 20 to 200° C., and more preferably 40 to 180° C. The heating temperature for cross-linking is preferably 130 to 200° C., and more preferably 140 to 200° C. When the heating temperature for cross-linking is excessively low, a long time may be required for cross-linking or the cross-linking density of the cross-linked rubber obtained is liable to be lowered. On the other hand, when the heating temperature for cross-linking is excessively high, molding defects may be yielded. The cross-linking time varies depending on cross-linking method, cross-linking temperature, shape, or the like. However, when it is within the range of 1 minute or more and 5 hours or less, it is preferable from the view point of cross-linking density and production efficiency. As a method of heating, any method selected from press heating, oven heating, steam heating, heat wave heating, and microwave heating etc. may be suitably used.

Further, depending on shape and size of the cross-linked rubber, cross-linking may not be fully progressed inside the product even when the cross-linking is found on the surface of the product. In such case, secondary cross-linking may be carried out by further heating. For carrying out secondary cross-linking, the heating temperature is preferably from 100 to 220° C., and more preferably 130 to 210° C. The heating time is preferably 30 minutes to 5 hours.

The volume resistivity value of the cross-linked rubber obtained in this way is usually $1\times10^{4.0}$ to $1\times10^{9.5}$ Ω·cm, preferably $1\times10^{4.5}$ to $1\times10^{8.0}$ Ω·cm, more preferably $1\times10^{5.0}$ to $1\times10^{7.2}$ Ω·cm, in terms of the value after 30 seconds from the start of application of voltage in the case of making the applied voltage 1000V in a measurement environment of a temperature of 23° C. and humidity of 50%. If the volume resistivity value of the cross-linked rubber is within the range, a conductive member which is excellent in low electrical resistance property is obtained. On the other hand, if the volume resistivity value of the cross-linked rubber is too high, higher voltage should be applied to obtain the same amount of electric current, causing increased power consumption, and therefore it is undesirable for a conductive member. Further, if the volume resistivity value of the cross-linked rubber is too low, electric current may flow in an undesired direction other than the direction applied with voltage, and thus the function as a conductive member may be impaired.

Further, the increase value in volume resistivity value of the cross-linked rubber obtained in this way that is caused by electric current is preferably within the range of 0 to 0.5 in terms of the value obtained by subtracting the $\log_{10}$ (volume resistivity value) obtained 30 seconds after applying voltage from the $\log_{10}$ (volume resistivity value) obtained 10 minutes after applying voltage under the condition for measuring volume resistivity value as described above.

The thus obtained cross-linked rubber is small in variation of the electrical resistance value, is low in electrical resistance value, and is suppressed in increase of the electrical resistance value even with continuous use, so can be suitably used for the conductive member used for a copier, printer, etc., particularly the conductive roll.

EXAMPLES

Below, examples and comparative examples will be given to more specifically explain the present invention. Note that, in the examples, "parts" are based on weight unless particularly indicated otherwise.

The various properties were evaluated in accordance with the following methods.

[Content of Onium Ion Units]

The onium ion unit content is measured as follows using a nuclear magnetic resonance apparatus ($^1$H-NMR). 30 mg of cationized polyether rubber, which had been obtained by the onium-forming followed by coagulation and drying, was added to 1.0 mL of dimethylsulfoxide and shaken for 1 hour for homogenous dissolution. The obtained solution was then measured by $^1$H-NMR to calculate the content ratio of onium ion unit. First, from the integrated values of the proton derived from the polyether chain, which is, a main chain of the cationized polyether rubber, mole number B1 of the entire monomer units in the polymer (including onium ion unit) was calculated. Next, from the integrated values of the proton derived from an onium ion-containing group, mole number B2 of the introduced onium ion units (i.e., the unit represented by the above general formula (1)) was calculated. Thereafter, by dividing the mole number B2 of the introduced onium ion units (i.e., the unit represented by the above general formula (1)) by the mole number B1 of the entire monomer units in the polymer (including onium ion unit), content ratio of onium ion unit was calculated as represented by the following formula.

Content ratio of onium ion unit (mol %)=100×$B2/B1$

[Mooney Viscosity]

The Mooney viscosity ($ML_{1+4}$, 100° C.) was measured in accordance with JIS K6300 at 100° C.

[Metal Corrosiveness]

To the polyether rubber, 1-methylimidazole and other compounding ingredients were mixed by kneading using open rolls at 25° C. for 5 minutes to obtaining a rubber composition (The composition of the formulation is shown in Table 1). The obtained rubber composition was placed on carbon steel SKD11 in a small amount and pressed by a hand press at 170° C. and 10 MPa in conditions. Further, this was allowed to stand for 3 hours, then the pressure was released. The rubber composition was relieved of pressure, the rubber composition was removed from the carbon steel SKD11, a cloth soaked in acetone was used to wipe the surface of the carbon steel SKD11, then the surface of the carbon steel SKD11 was visually examined to thereby evaluate the metal corrosiveness. Note that, the metal corrosiveness was evaluated in accordance with the following criteria.

1: Corrosion not seen on metal, while metal gloss maintained.
2: White cloudiness observed on metal.
3: Brown colored corrosion observed on metal.

Note that, in Examples 1 to 3, the screws were taken out from the twin-screw extruder-kneader after the reaction and evaluated for metal corrosiveness. The criteria for evaluation were similar to the above 1 to 3.

Production Example 1, Production of Polymerization Catalyst

The inside of a sealed pressure resistant glass container was replaced with nitrogen, then 200 parts of toluene and 60 parts of triisobutylaluminum were supplied. This glass container was immersed in ice water for cooling, then 230 parts of diethyl ether were added and stirred. Next, the mixture was cooled by ice water while adding 13.6 parts of phosphoric acid and further stirring. At this time, the reaction between the triisobutylaluminum and phosphoric acid caused the pressure inside the container to rise, so the pressure was released at suitable times. Next, the obtained reaction mixture was reacted to age in a 60° C. warm temperature bath for 1 hour to obtain a catalyst solution.

Production Example 2, Production of Polyether Rubber A

To an autoclave, 223.5 parts of epichlorohydrin, 27.5 parts of allylglycidyl ether, 19.7 parts of ethylene oxide, and 2585 parts of toluene were added. These were stirred in a nitrogen atmosphere while raising the temperature of the inside solution to 50° C., then 11.6 parts of the above catalyst solution was added to start a reaction. Next, from the start of the reaction, a solution comprised of 129.3 parts of ethylene oxide dissolved in 302 parts of toluene was continuously added over 5 hours at an equal speed. Further, every 30 minutes after the start of reaction, the catalyst solution was added in amounts of 6.2 parts each for addition over 5 hours. Next, 15 parts of water were added and stirred to end the reaction. To this, further, as an antiaging agent, 45 parts of a 5% toluene solution of 4,4'-thio-bis-(6-tert-butyl-3-methylphenol) were added and stirred. After that, steam stripping was performed to remove the toluene, the supernatant water was removed, then the result was dried in vacuo at 60° C. to obtain 400 parts of polyether rubber A. The ratio of composition of the monomers of the obtained polyether rubber A was measured by $^1$H-NMR and as a result was epichlorohydrin monomer units: 40 mol %, ethylene oxide monomer units: 56 mol %, and allylglycidyl ether monomer units: 4 mol %. Further, the obtained polyether rubber A had a Mooney viscosity of 60.

Reference Example 1

To 25° C. open rolls, 100 parts of the polyether rubber A obtained in Production Example 1, 3.22 parts of 1-methylimidazole, 2.4 parts of magnesium oxide, and 4.0 parts of calcium carbonate were charged and kneaded for 5 minutes to obtain a sheet-shaped rubber composition. Further, part of the obtained rubber composition was used in accordance with the above method to evaluate the metal corrosiveness. The results are shown in Table 1.

Reference Example 2

To 25° C. open rolls, 100 parts of the polyether rubber A obtained in Production Example 1, 3.22 parts of 1-methylimidazole, 1.8 parts of magnesium oxide, and 3.0 parts of calcium carbonate were charged and kneaded for 5 minutes to obtain a sheet-shaped rubber composition. Further, part of the obtained rubber composition was used in accordance with the above method to evaluate the metal corrosiveness. The results are shown in Table 1.

Reference Example 3

To 25° C. open rolls, 100 parts of the polyether rubber A obtained in Production Example 1, 3.22 parts of 1-methylimidazole, 0.9 part of magnesium oxide, and 1.5 parts of calcium carbonate were charged and kneaded for 5 minutes to obtain a sheet-shaped rubber composition. Further, part of the obtained rubber composition was used in accordance with the above method to evaluate the metal corrosiveness. The results are shown in Table 1.

Comparative Example 1

To 25° C. open rolls, 100 parts of the polyether rubber A obtained in Production Example 1 and 3.22 parts of 1-methylimidazole were charged and kneaded for 5 minutes to obtain a sheet-shaped rubber composition. That is, in Comparative Example 1, magnesium oxide or calcium carbonate as the acid acceptor were not added. Further, part of the obtained rubber composition was used in accordance with the above method to evaluate the metal corrosiveness. The results are shown in Table 1.

TABLE 1

| | | Reference Example 1 | Reference Example 2 | Reference Example 3 | Comparative Example 1 |
|---|---|---|---|---|---|
| | | Formulation | | | |
| Polyether rubber | (parts) | 100 | 100 | 100 | 100 |
| 1-methyl-imidazole | (parts) | 3.22 | 3.22 | 3.22 | 3.22 |
| Magnesium oxide | (parts) | 2.4 | 1.8 | 0.9 | — |
| Calcium carbonate | (parts) | 4.0 | 3.0 | 1.5 | — |
| Metal corrosiveness (three-point evaluation) | | 1 | 1 | 2 | 3 |

Evaluation of Reference Examples 1 to 3 and Comparative Example 1

As shown in Table 1, rubber compositions comprising a polyether rubber containing epihalohydrin monomer units in 0.1 mol % or more and a nitrogen atom-containing aromatic heterocyclic compound in which magnesium oxide and calcium carbonate as the acid acceptor are mixed are all suppressed in metal corrosion. Therefore, even when using such a rubber composition and kneading it by a twin-screw extruder-kneader, it can be said possible to prevent corrosion of the twin-screw extruder-kneader (Reference Examples 1 to 3).

On the other hand, when not containing magnesium oxide or calcium carbonate as the acid acceptor, the metal corrosiveness becomes remarkable and the result is inferior. For this reason, if using a rubber composition not containing magnesium oxide or calcium carbonate as the acid acceptor and kneading it by a twin-screw extruder-kneader, it can be estimated that the twin-screw extruder-kneader will be severely corroded and the productivity will become extremely poor (Comparative Example 1).

Example 1

(Production of Cationized Polyether Rubber 1)

To 25° C. open rolls, 100 parts of the polyether rubber A obtained in Production Example 1 and 3.22 parts pf 1-methylimidazole were charged and kneaded for 5 minutes to obtain a sheet-shaped rubber composition. Next, the obtained sheet-shaped rubber composition was charged together with 2.4 parts of magnesium oxide and 4.0 parts of calcium carbonate into a crusher (product name "SM 300", made by Retsch) and crushed at room temperature by a speed of 1500 rpm to obtain a pellet-shaped rubber composition.

Next, the above obtained pellet-shaped rubber composition was charged into a twin-screw extruder-kneader (made by Parker Corporation, L/D=61, screw material: carbon steel SKD11) by a charging rate of 1 kg/h and kneaded by the twin-screw extruder-kneader under heated conditions to cause the polyether rubber A and 1-methylimidazole to react and obtain the cationized polyether rubber 1. At this time, in the twin-screw extruder-kneader, the dwell time (kneading time) of the rubber composition was 9 minutes, and the temperature (kneading temperature) of the cationized polyether rubber right after being discharged from the twin-screw extruder-kneader was 160° C.

Further, the obtained cationized polyether rubber 1 was measured by $^1$H-NMR in accordance with the above-mentioned method to thereby calculate the content of onium ion units.

Further, the screws were taken out from the twin-screw extruder-kneader after the reaction and examined, whereby no corrosion was seen and the metal gloss was maintained.

The results are shown in Table 2.

Example 2

(Production of Cationized Polyether Rubber 2)

Except for making the dwell time (kneading time) of the rubber composition in the twin-screw extruder-kneader 11.5 minutes and changing the heating conditions of the twin-screw extruder-kneader and adjusting the temperature (kneading temperature) of the just discharged cationized polyether rubber discharged from the twin-screw extruder-kneader to 164° C., the same procedure was followed as in Example 1 to obtain a cationized polyether rubber 2. Further, the obtained cationized polyether rubber 2 was measured by $^1$H-NMR in accordance with the above-mentioned method to thereby calculate the content of onium ion units.

Further, the screws were taken out from the twin-screw extruder-kneader after the reaction and examined, whereby no corrosion was seen and the metal gloss was maintained.

The results are shown in Table 2.

Example 3

(Production of Cationized Polyether Rubber 3)

Except for making the dwell time (kneading time) of the rubber composition in the twin-screw extruder-kneader 8 minutes and changing the heating conditions of the twin-screw extruder-kneader to thereby adjust the temperature (kneading temperature) of the just discharged cationized polyether rubber discharged from the twin-screw extruder-kneader to 182° C., the same procedure was followed as in Example 1 to obtain a cationized polyether rubber 3. Further, the obtained cationized polyether rubber 3 was measured by $^1$H-NMR in accordance with the above-mentioned method to thereby calculate the content of onium ion units.

Further, the screws were taken out from the twin-screw extruder-kneader after the reaction and examined, whereby no corrosion was seen and the metal gloss was maintained.

The results are shown in Table 2.

Comparative Example 2

(Production of Cationized Polyether Rubber 4)

200 g of the rubber composition obtained in Comparative Example 1 was pressed and simultaneously heated using a press-forming machine at 160° C. for 10 minutes to thereby cause the polyether rubber A and 1-methylimidazole to react and obtain a cationized polyether rubber 4. Further, the obtained cationized polyether rubber 4 was measured in accordance with the above-mentioned method by $^1$H-NMR to calculate the content of onium ion units.

The results are shown in Table 2.

Note that, in Comparative Example 2, the same rubber composition was used as Comparative Example 1, so the result of the "metal corrosiveness" becomes the same value as Comparative Example 1.

TABLE 2

|  |  | Example 1 | Example 2 | Example 3 | Comparative Example 2 |
|---|---|---|---|---|---|
| Formulation | | | | | |
| Polyether rubber | (parts) | 100 | 100 | 100 | 100 |
| 1-methylimidazole | (parts) | 3.22 | 3.22 | 3.22 | 3.22 |
| Magnesium oxide | (parts) | 2.4 | 2.4 | 2.4 | — |
| Calcium carbonate | (parts) | 4.0 | 4.0 | 4.0 | — |
| Onium forming reaction | | | | | |
| Reaction method | | Twin-screw extruder | Twin-screw extruder | Twin-screw extruder | Press-forming machine |
| Reaction temperature | (° C.) | 160 | 164 | 182 | 160 |
| Reaction time | (min) | 9 | 11.5 | 8 | 10 |
| Content of onium ion units | (mol %) | 1.1 | 1.9 | 1.5 | 0.9 |
| Metal corrosiveness (three-point evaluation) | | 1 | 1 | 1 | 3 |

Evaluation of Examples 1 to 3 and Comparative Examples 1 to 2

As shown in Table 2, when kneading polyether rubber containing epihalohydrin monomer units in 0.1 mol % or more and a nitrogen atom-containing aromatic heterocyclic compound in the presence of magnesium oxide and calcium carbonate as the acid acceptor by using a twin-screw extruder-kneader to thereby cause an onium-forming reaction to proceed, it was possible to obtain a cationized polyether rubber by a 1 kg/h productivity (Examples 1 to 3). Further, in Examples 1 to 3, no corrosion of the screws of the twin-screw extruder-kneader occurred. Note that, this result matches the result of metal corrosiveness in the above-mentioned Reference Example 1.

On the other hand, when obtaining a rubber composition not containing magnesium oxide or calcium carbonate as the acid acceptor and using a press-fainting machine to heat it simultaneously with pressing to thereby cause an onium-forming reaction to proceed, not only was the reaction speed slower compared with when using a twin-screw extruder-kneader, but also since a batch system was used, the productivity was poor. The problem of metal corrosion also occurred.

The invention claimed is:

1. A method of production of a polyether rubber containing units expressed by the following general formula (1) in 0.1 mol % to less than 30 mol % comprising reacting a polyether rubber containing epihalohydrin monomer units in 0.1 mol % or more and a nitrogen atom-containing aromatic heterocyclic compound by kneading in the presence of an acid acceptor using an extruder-kneader so as to make at least part of halogen atoms forming the epihalohydrin monomer units be substituted by a group containing a cationic nitrogen-containing aromatic heterocyclic structure:

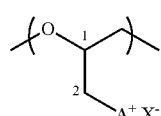

(1)

wherein, in the above general formula (1), $A^+$ is a group containing a cationic nitrogen-containing aromatic heterocyclic structure, where the group containing a cationic nitrogen-containing aromatic heterocyclic structure is bonded with a carbon atom at the "2" position shown in the above general formula (1) through a nitrogen atom forming the cationic nitrogen-containing aromatic heterocyclic structure, and $X^-$ is any counter anion.

2. The method of production of a polyether rubber according to claim 1, wherein the extruder-kneader is a twin-screw extruder-kneader.

3. The method of production of a polyether rubber according to claim 1, wherein a kneading temperature by the extruder-kneader is 162° C. or more.

4. The method of production of a polyether rubber according to claim 1, wherein a kneading time by the extruder-kneader is 1 to 30 minutes.

5. The method of production of a polyether rubber according to claim 1, wherein the extruder-kneader with an L/D (screw length/screw diameter)=1 to 100 is used.

6. The method of production of a polyether rubber according to claim 1, wherein an oxide, hydroxide, and/or carbonate of at least one type of magnesium, calcium, and barium are used as the acid acceptor.

7. The method of production of a polyether rubber according to claim 6, wherein an oxide and carbonate are used in combination as the acid acceptor.

8. The method of production of a polyether rubber according to claim 6, wherein a magnesium compound and calcium compound are used in combination as the acid acceptor.

9. The method of production of a polyether rubber according to claim 6, wherein a magnesium oxide and calcium carbonate are used in combination as the acid acceptor.

10. The method of production of a polyether rubber according to claim 1, wherein a use amount of the acid acceptor is 0.1 to 30 parts by weight with respect to 100 parts by weight of the polyether rubber containing epihalohydrin monomer units in 0.1 mol % or more.

* * * * *